(12) United States Patent
Yang et al.

(10) Patent No.: US 10,008,795 B2
(45) Date of Patent: Jun. 26, 2018

(54) CARD SOCKET FOR ELECTRONIC DEVICE

(71) Applicant: Molex, LLC, Lisle, IL (US)

(72) Inventors: In Chull Yang, Ansan (KR); In Ho You, Ansan (KR); Da Woon Lee, Ansan (KR)

(73) Assignee: Molex, LLC, Lisle, IL (US)

( * ) Notice: Subject to any disclaimer, the term of this patent is extended or adjusted under 35 U.S.C. 154(b) by 0 days. days.

(21) Appl. No.: 15/367,703

(22) Filed: Dec. 2, 2016

(65) Prior Publication Data

US 2017/0194728 A1   Jul. 6, 2017

(30) Foreign Application Priority Data

Dec. 31, 2015   (KR) .................. 10-2015-0190734

(51) Int. Cl.
| | |
|---|---|
| *H01R 24/00* | (2011.01) |
| *H01R 12/72* | (2011.01) |
| *H01R 12/70* | (2011.01) |
| *G06K 7/00* | (2006.01) |
| *H01R 13/24* | (2006.01) |

(52) U.S. Cl.
CPC ......... *H01R 12/721* (2013.01); *G06K 7/0052* (2013.01); *H01R 12/7082* (2013.01); *H01R 13/2442* (2013.01)

(58) Field of Classification Search
CPC .. G06K 13/08; G06K 7/0021; H01R 23/7005; H01R 23/7068
USPC ................................. 439/159, 377, 630, 631
See application file for complete search history.

(56) References Cited

U.S. PATENT DOCUMENTS

| | | | | |
|---|---|---|---|---|
| 7,090,536 B2* | 8/2006 | Choy | ..................... | H01R 27/02 439/630 |
| 7,108,558 B2* | 9/2006 | Zhu | ....................... | G06K 7/0034 439/630 |
| 7,338,326 B2* | 3/2008 | Su | .......................... | H01R 27/02 439/630 |
| 7,563,138 B2* | 7/2009 | Zhang | ................ | H01R 13/7031 439/188 |
| 7,771,231 B2* | 8/2010 | Kim | ....................... | G06K 7/0021 439/541.5 |
| 7,802,727 B1* | 9/2010 | Tsai | ...................... | H04B 1/3816 235/375 |
| 7,833,064 B1* | 11/2010 | Lai | ........................ | G06K 7/0021 439/630 |
| 7,909,644 B1* | 3/2011 | Li | ......................... | H01R 12/724 439/541.5 |
| 8,113,886 B2* | 2/2012 | Jung | ................... | H01R 12/7005 439/630 |

(Continued)

FOREIGN PATENT DOCUMENTS

KR    2005-0100875 A    10/2005

*Primary Examiner* — Thanh Tam Le
(74) *Attorney, Agent, or Firm* — James A. O'Malley

(57) ABSTRACT

A card socket for use in an electronic device is disclosed, wherein two cards may be inserted on top of one another into the card insertion space, so that both of the two cards may be used continuously. The card socket according to one embodiment of this disclosure for use in an electronic device comprises a housing having a space wherein a card is inserted, wherein the housing comprises a step part having a staircase shape in the card insertion direction within the card insertion space, so that two or more cards may be inserted on top of one another.

16 Claims, 5 Drawing Sheets

(56) References Cited

U.S. PATENT DOCUMENTS

| | | | | |
|---|---|---|---|---|
| 8,172,586 B2* | 5/2012 | Tsai | ................. | H01R 27/02 |
| | | | | 439/159 |
| 8,500,469 B2* | 8/2013 | Takai | ................. | G06K 7/0043 |
| | | | | 439/159 |
| 8,870,584 B2* | 10/2014 | Ma | ................. | H01R 13/633 |
| | | | | 439/159 |
| 9,400,899 B2* | 7/2016 | Seo | ................. | G06K 7/0052 |

* cited by examiner

CARD SOCKET FOR ELECTRONIC DEVICE

RELATED APPLICATIONS

This application claims priority to Korean Application No. 10-2015-0190734, filed Dec. 31, 2015, which is incorporated herein by reference in its entirety.

TECHNICAL FIELD

This disclosure relates to a card socket for electronic devices, and more specifically to a card socket for use in electronic devices that can permanently use both of two cards.

BACKGROUND ART

In mobile communication terminals and similar electronic devices that are generally used, there are respectively furnished memory cards that enable authentication with respect to personal information and credit transactions, and memory cards for storing data when using diverse kinds of content.

Of these memory cards, memory cards that are used for authentication of personal information and credit transactions include SIM cards, RUIM cards, Moneta cards, BankOn cards, etc.; memory cards that are used for storing data for diverse kinds of content include mini SD cards, smart media cards, memory sticks, SD picture cards, micro SD cards, etc.

In the prior art, memory cards for authentication and memory cards for data were respectively mounted in different card sockets in different positions on the mobile communication terminal in order to be connected to the device; because space was needed for the mounting of each card socket, this created obstacles to the slimming and downscaling of mobile terminals, and also led to limits on the installation of parts to add new functionality.

To resolve these problems, a dual card socket that enables simultaneously locking and accessing authentication memory cards and data memory cards in a single card socket; an example thereof has been disclosed as ROK Unexamined Patent Publication 2005-0100874 as a "Dual access apparatus for accessing storage media and mobile communication terminal furnished with same."

However, in the case of dual card sockets, because their structure forms respective spaces in to which a memory card for authentication is inserted and into which a memory card for data is inserted, they limit the extent to which card sockets may be slimmed and miniaturized.

In addition, in the case of a structure in which only one of the two card types is used, it has the disadvantage that both cards cannot be continuously used.

In addition, it has the disadvantage that because two contact terminals for contacting the two card types are furnished, e.g. a SIM contact terminal and an SD contact terminal, it is necessary to manufacture molds for both types of contact terminals, which increases molding costs.

Patent Reference 0001: Republic of Korea Registered Patent No. 2005-0100874 (2005 Oct. 20).

SUMMARY

The problem that this disclosure seeks to solve is the provision of a card socket for use in an electronic device, wherein two cards may be inserted on top of one another into the card insertion space, so that both of the two cards may be used continuously.

Another technical task of the disclosure is to provide a card tray for electronic devices that facilitates the manufacture of terminals by forming the two contact terminals as a single unit.

To accomplish the above technical tasks, the card socket according to one embodiment of this disclosure for use in an electronic device comprises a housing having a space wherein a card is inserted, wherein the housing may comprise a step part having a staircase shape in the card insertion direction within the card insertion space, so that two or more cards may be inserted on top of one another.

In addition, the housing may further comprise: a 1st card insertion part that forms a lower layer of the card insertion space so as to be positioned at the bottom of the step part, forming a space whereinto a 1st card is inserted; and a 2nd card insertion part that forms an upper layer of the card insertion space so as to be positioned on the top of the step part, forming a space above the 1st card insertion part whereinto a 2nd card is inserted.

In addition, the step part may be positioned behind the 1st card insertion part, and entrance of the 1st card may be blocked by the back end of the 1st card, when inserted into the 1st card insertion space, striking the front of the step part.

In addition, on the front top of the step part, a surface may be formed that is sloped upward in the card insertion direction, so as to correspond to the upwardly-sloped surface formed on the rear bottom of the 2nd card, and so that when the 2nd card is inserted into the 2nd card insertion part, the 2nd card is smoothly inserted as the sloped surface of the 2nd card contacts the sloped surface of the step part as it moves.

In addition, the card socket for use in an electronic device may further comprise contact terminals installed in the housing so as to contact the card; and the contact terminals may comprise: 1st contact terminals that contact the 1st card inserted into the 1st card insertion part, located in front of the step part in the card insertion direction; and 2nd contact terminals that contact the 2nd card inserted into the 2nd card insertion part, located behind the step part in the card insertion direction.

The 2nd contact terminals may have a shape that is bent toward the front in the card insertion direction, and the top part of the 2nd contact terminals may be positioned higher than the top surface of the step part, while the front part of the 2nd contact terminals is positioned lower than the top surface of the step part, and is formed sloping downward in the insertion/withdrawal direction of the 2nd card.

In addition, the 1st contact terminals and the 2nd contact terminals may be formed as a single unit.

In addition, a soldering part may be positioned in front of the 2nd contact terminals in the card insertion direction.

The card tray for electronic devices of this disclosure has the following effects.

First, in this disclosure, a step part having a staircase shape in the card insertion direction is formed inside the card insertion space of the housing, so that a 1st card insertion part whereinto a 1st card such as a SIM card is inserted, and a 2nd card insertion part whereinto a 2nd card such as an SD card is inserted, are positioned above and below, so that the two cards may be inserted on top of each other. Accordingly, this disclosure has the effect that both of two cards inserted above and below may be used continuously, due to the staircase shape of the step part formed in the housing, and that slimming and miniaturization of the card socket may be achieved.

Second, this disclosure has the effect of enabling the straightforward manufacture of terminals using a mold for a single contact terminal, because the 1st contact terminals and 2nd contact terminals are formed as a single unit, and the soldering part of the 2nd contact terminals is configured toward the front in the card insertion direction, toward the 1st contact terminals.

Third, this disclosure has the effect of preventing damage to the terminals during card insertion/withdrawal and when the card is improperly inserted, because the 2nd contact terminals are formed in a C shape, and the front part of the 2nd contact terminals is formed lower than the top surface of the step part, sloping in the card insertion/withdrawal direction.

Fourth, this disclosure has the effect that the upside-down insertion of a tray onto which a card has been mounted is prevented, because a step having a staircase shape for preventing tray mis-insertion is formed toward the back of the housing insertion space.

DETAILED DESCRIPTION OF THE PREFERRED EMBODIMENTS

Hereinbelow, a preferred embodiment of the card socket of this disclosure for use in an electronic device will be described, with reference to the attached drawings. Please note that in describing this disclosure, the detailed explanation is omitted of functions and components which are common knowledge and are judged to unnecessarily obscure the core intent of the disclosure.

Figure 1:
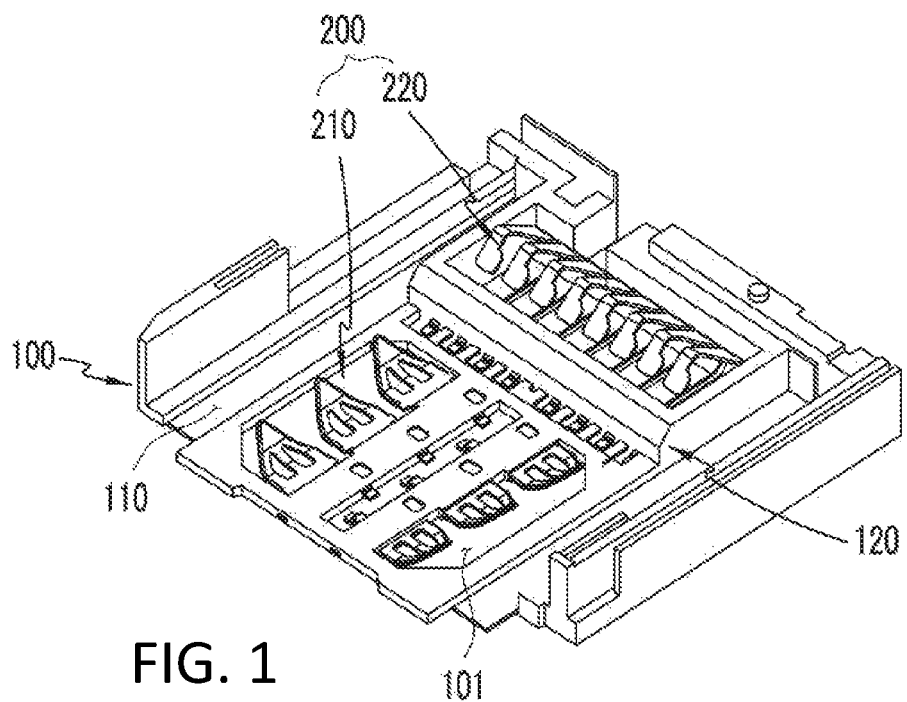
FIG. 1 is a perspective view showing the card socket for use in an electronic device according to one embodiment of this disclosure, viewed from above.
Figure 2:
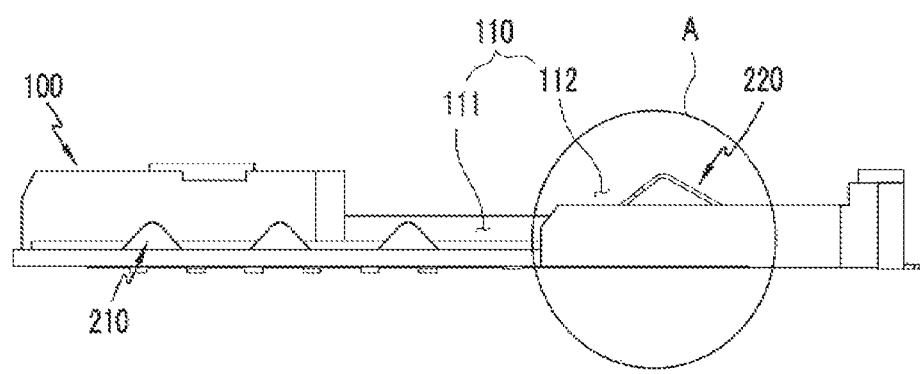
FIG. 2 is a side view showing the card socket for use in an electronic device according to one embodiment of this disclosure.
Figure 3:
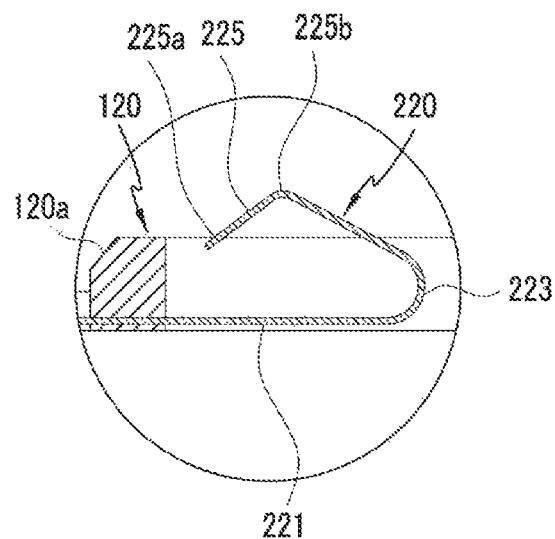
FIG. 3 is cross-section of portion A of FIG. 2.
Figure 4:
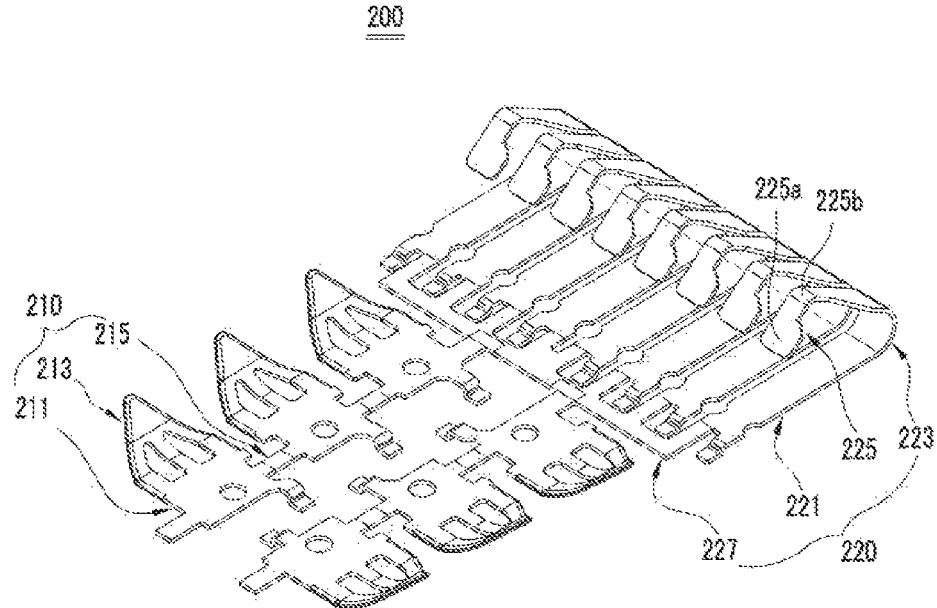
FIG. 4 is a perspective view of the card socket of this disclosure for use in an electronic device.
Figure 5:
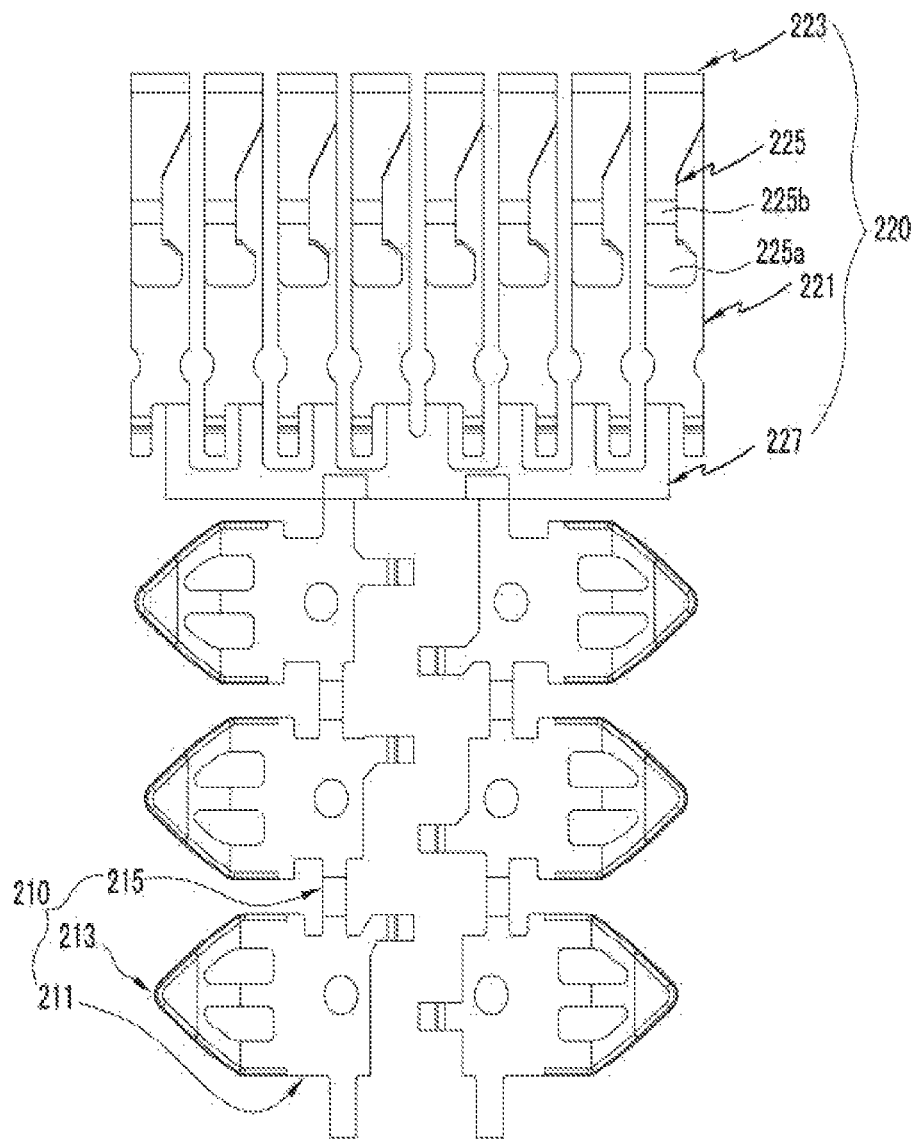
FIG. 5 is a top view of FIG. 4.
Figure 6:
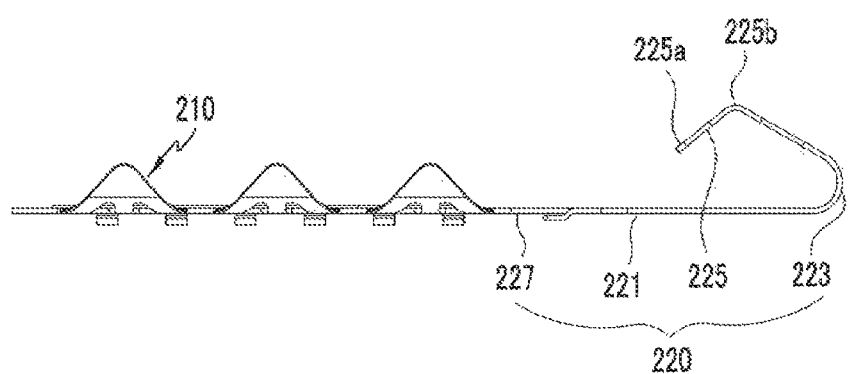
FIG. 6 is a side view of FIG. 4.
Figure 7:
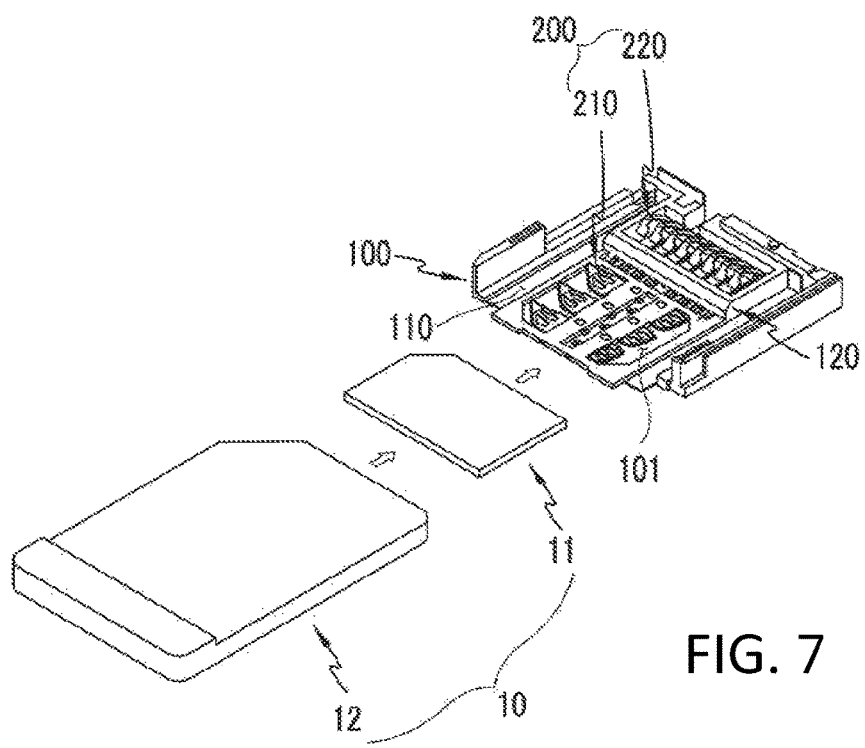
FIG. 7 is a perspective view showing the respective insertion of two cards into the card socket of this disclosure for use in an electronic device.
Figure 8:
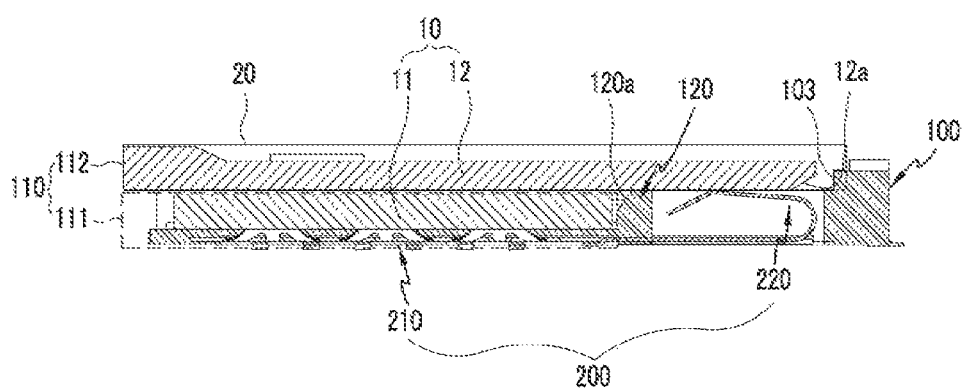
FIG. 8 is cross-section showing the state in which two cards have been inserted into the card socket of this disclosure for use in an electronic device.

FIG. 1 is a perspective view showing the card socket for use in an electronic device according to one embodiment of this disclosure, viewed from above, FIG. 2 is a side view showing the card socket for use in an electronic device according to one embodiment of this disclosure, FIG. 3 is cross-section of portion A of FIG. 2, FIG. 4 is a perspective view of the card socket of this disclosure for use in an electronic device, FIG. 5 is a top view of FIG. 4, FIG. 6 is a side view of FIG. 4, FIG. 7 is a perspective view showing the respective insertion of two cards into the card socket of this disclosure for use in an electronic device, and FIG. 8 is cross-section showing the state in which two cards have been inserted into the card socket of this disclosure for use in an electronic device.

As shown in FIGS. 1 through 8, the card socket for use in an electronic device according to an embodiment of this disclosure may comprise a housing 100 and contact terminals 200.

The housing 100 has front end into which a card 10 is inserted and an insertion space 110 that is opened toward the top and covered by a metal shell (not shown).

On the bottom surface of the insertion space 110 of the housing 100, contact terminals 200 that contact the card 10 may be furnished.

In addition, at the back of the insertion space 110 of the housing 100, a card insertion verification terminal (not shown) may be furnished that detects the insertion of the card 10.

The housing 100 comprises a step part 120 inside the card insertion space 110 and having a staircase shape in the card insertion direction, so that two or more cards 10 may be inserted on top of each other. Because of the staircase shape of this step part 120, two or more cards 10 that are inserted above and below each other may be used continuously.

The step part 120 may be positioned at the back of the below-described 1st card insertion part 111 and may be configured to have a staircase shape having a difference in vertical height. By this means, the rear end of the 1st card 11 inserted into the 1st card insertion part 111 blocks the entry of the 1st card 11 when it strikes the front end of the step part 120.

The step part 120 is formed in the shape of a rectangular frame bar on the floor of the rear of the card insertion space 110 of the housing 100, and the below-described 2nd contact terminals 220 have an open top surface so as to be exposed upward.

In other words, because the step part 120 is formed in a staircase shape protruding upward to a certain height from the floor of the insertion space 110 of the housing 100 at the outer edge of the 2nd contact terminals 220, it separates the 1st card insertion part 111 that forms the lower layer of the card insertion space 110 and the 2nd card insertion part 112 that forms the upper layer of the card insertion space 110, thus enabling two cards 11, 12 to be inserted on top of each other.

In addition, in the step part 120, a surface 120a sloping upward relative to the card insertion direction may be formed so as to correspond to the upward sloping surface 12a formed on the back bottom of the 2nd card 12. According, when the 2nd card 12 is inserted into the 2nd card insertion part 112, as the sloped surface 12a of the 2nd card 12 contacts the sloped surface of the step part 120 as it moves, the 2nd card 12 may be smoothly inserted.

The housing 100 may comprise a 1st card insertion part 111 and a 2nd card insertion part 112.

The 1st card insertion part 111 forms a lower layer of the card insertion space 110 aligned with the bottom of the step part 120, and forms a space into which a 1st card 11 is inserted.

The 2nd card insertion part 112 forms an upper layer of the card insertion space 120 aligned with the top of the step part 120, and forms a space above the 1st card insertion part 111 into which a 2nd card 12 is inserted.

In this embodiment, a configuration has been depicted wherein the 1st card 11 is a SIM card and the 2nd card 12 is an SD card, but this is not limiting, and they may also be configured as other cards other than SIM cards and SD cards.

For example, for the 1st card 11, memory cards may be used that are used for authentication of personal information and credit transactions, such as SIM cards, RUIM cards, Moneta cards, BankOn cards, etc.; for the 2nd card 12 memory cards may be used that are used for storing data for diverse kinds of content such as mini SD cards, smart media cards, memory sticks, SD picture cards, micro SD cards, etc.

The contact terminals 200 may be installed in the housing 100 so as to contact the card 10 that is inserted into the card insertion space 110 of the housing 100.

The contact terminals 200 may comprise 1st contact terminals 210 and 2nd contact terminals 220.

The 1st contact terminals 210 are installed on the housing 100 so as to be located in front of the step part 120 in the card insertion direction.

The 1st contact terminals 210 are formed as terminals having a triangular shape, and the triangular terminals are bent upward so as to protrude into the 1st card insertion part 111 via the terminal opening 101 formed in the floor of the front of the card insertion space 110 of the housing 100, and contact the bottom of the 1st card 11 inserted into the 1st card insertion part 111.

The 1st contact terminals 210 may comprise a support part 211 supported on the floor of the housing 100, and a bending part 213 that is extended upward on the support part 211 and contacts the 1st card 11.

The plurality of triangular 1st contact terminals 210 are arrayed in two rows in the card insertion direction, and the respective rows are integrally connected together by a connecting part 215.

The 1st contact terminals 210 are connected to the soldering part 227 of the 2nd contact terminals described below, so that the 1st contact terminals 210 are formed as a single unit with the 2nd contact terminals 220.

The 2nd contact terminals 220 are installed on the housing 100 so as to be located behind the step part 120 in the card insertion direction, and contact the bottom of the 2nd card 12 inserted into the 2nd card insertion part 112.

A plurality of 2nd contact terminals 220 may be furnished and spaced apart horizontally in the card insertion direction, and arranged in line with one another.

The 2nd contact terminals 220 have a shape that is bent forward in the card insertion direction. In this embodiment, the 2nd contact terminals 220 have been depicted as formed roughly in a C shape, but are not limited thereto, and may also be varied to diverse other shapes.

The 2nd contact terminals 220 may comprise a support part 221, bending part 223, and contact part 225.

The support part 221 is configured in the shape of a board positioned lengthwise in the card insertion direction, so as to be supported on the floor of the housing 100.

The bending part 223 is bent extending forward from the back of the support part 221.

The contact part 225 extends upward toward the front from the bending part 223, and then is bent downward at the top so that the front end of the contact part 225 slopes downward. The front end part 225a of the contact part 225 may be formed so as to expand the cross-sectional area relative to that of the top bent part 225b, so that the area of contact with the 2nd card 12 may be expanded.

The tops of the contact parts 225 of the 2nd contact terminals 220 is positioned to be higher than the top surface of the step part 120, so as to be pushed and elastically deformed downward upon contacting the bottom surface of the 2nd card 12 inserted into the 2nd card insertion part 112.

In addition, the front ends of the contact parts 225 of the 2nd contact terminals 220 are positioned below the top surface of the contact part 120; they may be formed so as to slope downward at 45 degrees relative to the insertion/withdrawal direction of the 2nd card 12. By this means, when the 2nd card 12 is inserted into the 2nd card insertion part 112 so as to pass the top surface of the step part 120, it enters by riding along the sloped surface of the front ends 225a of the 2nd contact terminals 220 which are formed sloping downward from the top surface of the step part 120, and accordingly, because the 2nd contact terminals 220 are naturally pressed downward, damage to the terminals during the insertion/withdrawal of the card 10 may be prevented.

The 1st contact terminals 210 and 2nd contact terminals 220 may be formed as a single unit. For example, the soldering part 227 of the 2nd contact terminals 220 may be located forward in the card insertion direction, and the 1st contact terminals 210 may be formed as a single unit with the 2nd contact terminals 220 via the soldering part 227.

In addition, at the back of the insertion space 110 of the housing 100, a step 103 having a staircase shape is formed in order to prevent tray mis-insertion, so that a tray 20 on which a card has been mounted may be prevented from being inserted upside-down.

In the card socket of this disclosure for use in an electronic device, configured as above, a step part 120 having a staircase shape in the card insertion direction is formed within the card insertion space 110 of the housing 100, so as to position, above and below each other, a 1st card insertion part 111 whereinto a 1st card 11 such as a SIM card is inserted and a 2nd card insertion part 112 whereinto a 2nd card such as an SD card is inserted, so that two cards 1112 may be inserted on top of each other. Accordingly, in this disclosure, because of the staircase shape of this step part 120 formed in the housing 100, two cards 1112 that are inserted above and below each other may be used continuously.

In addition, the 1st contact terminals 210 and 2nd contact terminals 220 are formed as a single unit, and because the soldering part 227 of the 2nd contact terminals 220 is configured in front of the 1st contact terminals 210 in the card insertion direction, manufacture of the terminals can be accomplished easily using a single contact terminal mold.

In addition, damage may be prevented to the terminals both during card insertion/withdrawal and when the card is improperly inserted, because the 2nd contact terminals 220 are formed in a C shape, and the front part 225 of the 2nd contact terminals 220 is formed lower than the top surface of the step part 120, and sloping in the card insertion/withdrawal direction.

Hereinabove, embodiments of this disclosure were described with reference to the attached drawings, but a person of ordinary skill in the art to which this disclosure pertains will be able to understand that this disclosure may be implemented in different specific forms without altering the necessary characteristics or technical idea thereof. Therefore, the embodiments described hereinabove must be understood as exemplary, rather than limiting, in all respects. The scope of this disclosure is set forth in the claims below rather than in the detailed description; all alterations or altered forms derived from the meaning, scope and equivalents of the claims must be considered to be included within the scope of this disclosure.

The invention claimed is:

1. A card socket for use in an electronic device, the card socket being configured to have first and second cards received therein at the same time with the second card being positioned on top of the first card, the card socket comprising:

a housing having a card insertion space which is open at a front end of the housing, wherein the card insertion space is configured to have the first and second cards inserted therein from the front end, the housing having a step part having a staircase shape which extends upwardly into the card insertion space in order to separate the card insertion space into a first card insertion part and a second card insertion part, the first card insertion part being positioned forward of the step part, the second card insertion part being positioned above the first card insertion part and above the step part; and a contact terminal assembly installed in the housing, the contact terminal assembly having first contact terminals and second contact terminals which are in direct contact with one another, the first contact terminals being positioned forward of the step part and extending upwardly into the first card insertion part, the second contact terminals being positioned rearward of the step part and extending upwardly into the second card insertion part, wherein, in operation, the first card insertion part is configured to receive the first card therein and the first contact terminals are configured to contact a bottom of the first card, and the second card insertion part is configured to receive the second card therein, while the first card is received in the first card insertion part, and the second contact terminals are configured to contact a bottom of the second card.

2. The card socket according to claim 1, wherein a front end of the step part is configured to block further entry of the first card into the first card insertion part.

3. The card socket according to claim 1, wherein the step part has an upwardly and rearwardly sloping surface which is configured to contact and guide the second card as it is inserted into the second card insertion part.

4. The card socket according to claim 1, wherein the second contact terminals are generally C-shaped in configuration.

5. The card socket according to claim 4, wherein the second contact terminals have a support part, a bending part, and a contact part, the support part extending rearwardly from the step part to the bending part, the bending part extending forwardly and upwardly to the contact part, the contact part being at least partially positioned within the second card insertion part in order to allow the bottom of the second card to contact the contact part.

6. The card socket according to claim 5, wherein the contact part has a top bent part and a front end part, the top bent part being positioned within the second card insertion part in order to allow the bottom of the second card to contact the top bent part of the contact part, the front end part extending forwardly and downwardly from the top bent part.

7. The card socket according to claim 1, wherein the second contact terminals have a soldering part at a forward end thereof, the first contact terminals being connected to the soldering part.

8. The card socket according to claim 1, wherein the first and second contact terminals are integrally formed.

9. A card socket for use in an electronic device, the card socket being configured to have first and second cards received therein at the same time with the second card being positioned on top of the first card, the card socket comprising:

a housing having front and rear ends and side ends, the housing having a card insertion space which is open at the front end of the housing, wherein the card insertion space is configured to have the first and second cards inserted therein from the front end of the housing, the card insertion space further being configured to prevent the first and second cards from being inserted therein from the rear and side ends of the housing, the housing having a step part having a staircase shape which extends upwardly into the card insertion space in order to separate the card insertion space into a first card insertion part and a second card insertion part, the first card insertion part being positioned between the front end of the housing and the step part, the second card insertion part being positioned above the first card insertion part and above the step part; and a contact terminal assembly installed in the housing, the contact terminal assembly having first contact terminals and second contact terminals which are in direct contact with one another, the first contact terminals being positioned forward of the step part and extending upwardly into the first card insertion part, the second contact terminals being positioned rearward of the step part and extending upwardly into the second card insertion part, wherein, in operation, the first card insertion part is configured to receive the first card therein via the front end of the housing and the first contact terminals are configured to contact a bottom of the first card, and the second card insertion part is configured to receive the second card therein via the front end of the housing, while the first card is received in the first card insertion part, and the second contact terminals are configured to contact a bottom of the second card.

10. The card socket according to claim 9, wherein a front end of the step part is configured to block further entry of the first card into the first card insertion part.

11. The card socket according to claim 9, wherein the step part has an upwardly and rearwardly sloping surface which is configured to contact and guide the second card as the second card is inserted into the second card insertion part.

12. The card socket according to claim 9, wherein the second contact terminals are generally C-shaped in configuration.

13. The card socket according to claim 12, wherein the second contact terminals have a support part, a bending part, and a contact part, the support part extending rearwardly from the step part to the bending part, the bending part extending forwardly and upwardly to the contact part, the contact part being at least partially positioned within the second card insertion part in order to allow the bottom of the second card to contact the contact part.

14. The card socket according to claim 13, wherein the contact part has a top bent part and a front end part, the top bent part being positioned within the second card insertion part in order to allow the bottom of the second card to contact the top bent part of the contact part, the front end part extending forwardly and downwardly from the top bent part.

15. The card socket according to claim 9, wherein the second contact terminals have a soldering part at a forward end thereof, the first contact terminals being connected to the soldering part.

16. The card socket according to claim 9, wherein the first and second contact terminals are integrally formed.

* * * * *